United States Patent Office 3,711,371
Patented Jan. 16, 1973

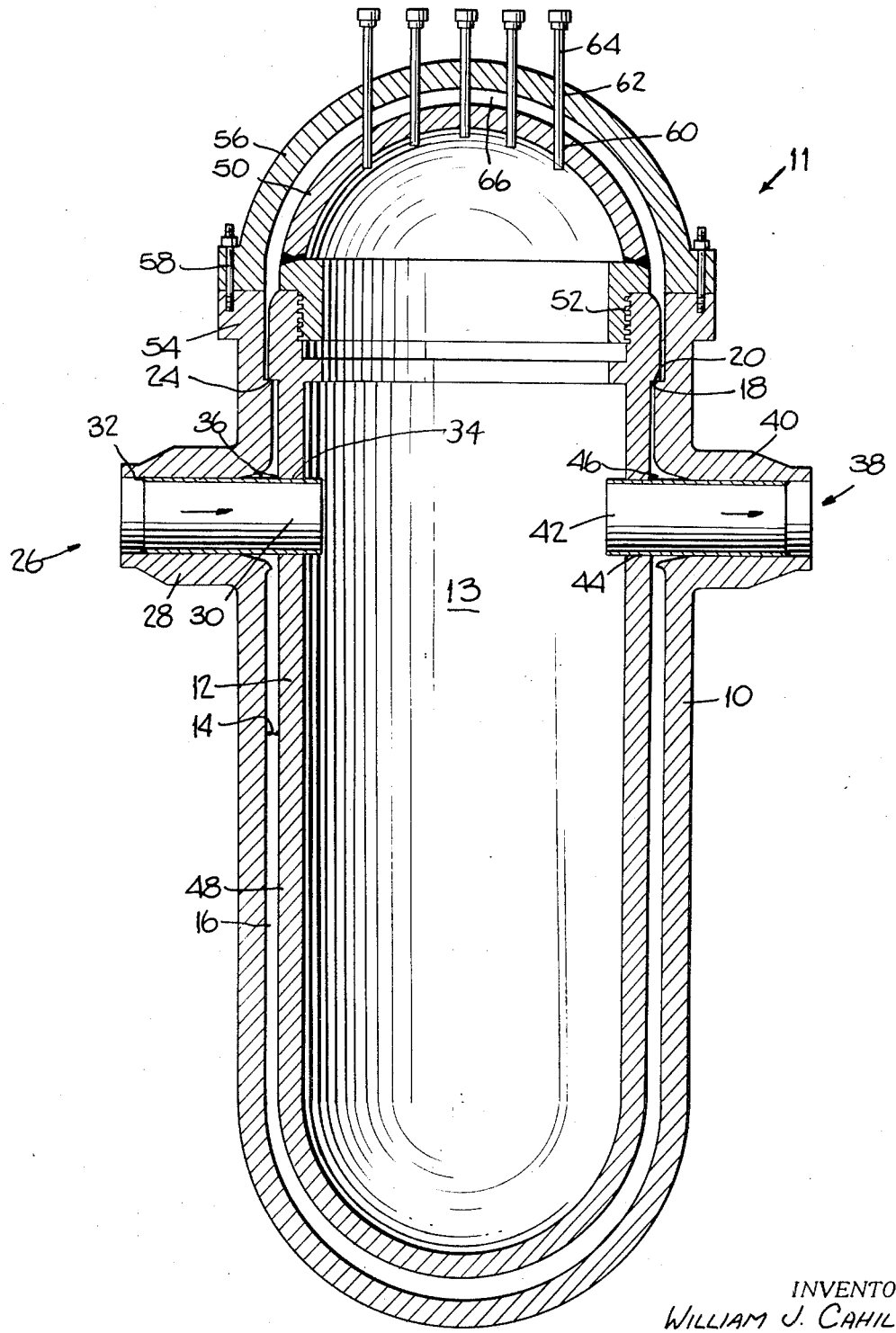

3,711,371
NUCLEAR REACTOR VESSEL STRUCTURE
William J. Cahill, Jr., West Nyack, N.Y., assignor to Consolidated Edison Company, New York, N.Y.
Continuation of abandoned application Ser. No. 687,548, Dec. 4, 1967. This application Jan. 6, 1971, Ser. No. 104,505
Int. Cl. G21c 13/02
U.S. Cl. 176—50                            11 Claims

ABSTRACT OF THE DISCLOSURE

A nuclear reactor pressure vessel structure having an inner vessel containing coolant fluid under pressure and completely encased within an outer vessel, the inner vessel being mounted in spaced relationship with respect to said outer vessel, and fluid under pressure equal to that of said coolant fluid disposed within said spacing between the vessels; fluid passages between said spacing between the vessels and the inside of said inner vessel whereby the fluid within said spacing is said coolant fluid.

---

This application is a continuation of my copending application Ser. No. 687,548, filed Dec. 4, 1967.

This invention relates to nuclear reactors and more particularly to the vessel structure which houses the core and blanket subassemblies.

Nuclear reactor vessels embodying the concept of this invention are particularly adapted, among other possible uses, for use with pressurized or boiling water type reactors.

In a conventional nuclear reactor, the fuel and other operative elements are situated in an enclosed vessel, the vessel being under high fluid pressure due to the moderator-coolant which is introduced into the vessel under very high pressure, i.e. from 1000 to 2500 p.s.i. (pounds per square inch) depending upon the type of system employed. In the highly improbable event that the retaining vessel should break or rupture, the relatively large quantity of fluid would be released with tremendous force which not only would propel any fragments of the vessel through the air as high velocity missiles, but might also break and perhaps similarly propel the fuel elements, or displace them, with the consequent possibility of loss of emergency cooling effectiveness and/or dispersal of radioactive material. The hypothetical consequences of breakage of conventional reactor vessels may be one of the principal reasons why authorities have been reluctant to permit the installation of nuclear power plants within or near densely populated areas.

The present invention provides a nuclear reactor vessel structure which will minimize the consequences of vessel breakage. Fracture occurring in a vessel in accordance with this invention will not result in generation of high energy missiles by the aforementioned sudden egress of all or most of its contained fluid and, further, will not result in serious mangling, breakage, or major displacement of the operative nuclear components which are also contained therein. As a result, the reactor may be considered safe for installation anywhere, even in the midst of metropolitan areas.

Briefly, the invention contemplates a nuclear reactor contained in a two-part vessel structure comprising an inner vessel in which the nuclear elements and the required moderator-coolant fluid under high pressure are contained, and an enclosing outer vessel whose interior surface is spaced a relatively small distance away from the exterior surface of the inner vessel. Fluid, under the same high pressure as that contained in the inner vessel, completely fills the spacing between the inner and outer vessels, thus balancing and eliminating the pressure differential as would otherwise exist between the interior and exterior surfaces of the inner vessel. In the preferred embodiment, small "leakage" passageways are provided between the inner vessel interior and the referred to spacing between the vessels, so that the fluid within such spacing is actually a portion of the conventional moderator-coolant fluid itself and therefore is, of course, under substantially the same pressure. The inner and outer vessels are each strong enough to preserve their respective integrities under the contained pressure in the event of rupture of the other, but it will be noted that in normal operation the contained pressure effectively acts upon only the outer vessel.

Thus, only the outer vessel is subject to rupture due to contained pressure, and only that relatively small quantity of fluid which is contained within the wall spacing between the vessels is free to pass through the outer vessel in the event of its rupture. The energy capable of acting upon the outer vessel in such event is therefore significantly diminished, and will result only in fluid leakage through the outer vessel rather than any serious fragmentation thereof. Since the inner vessel remains intact, so also do the nuclear elements therein contained and the latter are thus protected in the event of rupture of the outer vessel.

These and other objects, features and advantages of the invention will become more fully apparent from the following detailed description of the invention when taken together with the accompanying drawing.

The drawing is a vertical medial sectional view of a nuclear reactor pressure vessel constructed in accordance with the concept of this invention.

In the embodiment of the invention illustrated, the nuclear reactor pressure vessel 11 includes an outer pressure vessel 10, and an inner pressure vessel 12 completely encased within the outer vessel. Each of the vessels 10 and 12 is fabricated from any suitable material. For example, the vessels may be made of carbon steel, the inner vessel 12 having stainless steel cladding on its interior and exterior surfaces, and the outer vessel 10 having stainless steel cladding on its interior surface. Conventional nuclear reactor fuel assemblies (not shown) are mounted within the space 13 of the inner vessel 12. The inner vessel also contains moderator and/or coolant fluid (not illustrated) under high pressure, which fluid will be referred to herein simply as "coolant fluid" for convenience. At substantially all locations between their respectively adjacent surfaces, the two vessels are spaced one from the other a distance 16 for containing a relatively small quantity (as compared with the volume of the inner vessel) of fluid under high pressure. Considering practical limits imposed by conventional manufacturing tolerances and the like which affect costs and also certain operational factors (mentioned hereinafter) as would be affected were the spacing 16 very small, and further considering the overall size of the vessels insofar as such would cause a significant and therefore undesirable volume of fluid to be contained therebetween were the spacing 16 fairly large, the spacing distance 16 between the two vessels is preferably within the range of from a fraction of an inch (say, about one-quarter inch) to about two inches. Although conceivably (were the vessels adequately designed for the purpose) the high pressure of the fluid within the spacing 16 could be somewhat less than the pressure within the inner vessel 12 to an extent such that the objects of the invention might still be substantially achieved, the pressure of the fluid within the spacing 16 is more desirably equal to the fluid pressure within the inner vessel. Accordingly, in the embodiment being described, the space 16 between the two vessels is in fluid flow communication with the interior of the inner vessel (as will be explained) so that the spacing will be filled with the same coolant fluid which is contained in the inner vessel, and will be at substantially the same pressure during reactor operation.

It will be appreciated that the two vessels are spaced relatively close together so that in the event of rupture of the outer vessel, the energy available for throwing fragments of the outer vessel is minimal because of the limited amount of high pressure fluid contained between the two vessels, as compared to previous, single shell nuclear reactor vessels wherein the entire amount of high pressure coolant fluid within the vessel would be released. On the other hand the two vessels are spaced far enough apart so that there is no interference between the two vessels as might otherwise result from thermal expansion, vibration or other causes.

The inner vessel is mounted in such spaced relationship to the outer vessel by suitable means such as, for example by an outwardly projecting flange 20 on the inner vessel which seats on a mating inwardly projecting flange 18 on the outer vessel. The two flanges engage one another with a rather loose fit so that coolant fluid may pass therebetween and up to the upper portion (designated 66) of the spacing 16 between the two vessels. The flanges have spaced shallow interface openings 24 for the passage of coolant fluid between the respective portions of the space 16 above and below the flanges.

Inlet means indicated generally at 26 are provided for the passage of coolant fluid under pressure from outside the outer vessel to inside the inner vessel. The coolant fluid enters under any suitable high pressure, which may be about 2,500 p.s.i. in the case of a water pressurized system, or about 1000 p.s.i. in the case of a boiling water system. The inlet means includes an outwardly projecting boss or inlet nozzle 28 on the side of the outer vessel and an inlet sleeve 30 which is welded as at 32 or bolted or otherwise attached to the inlet nozzle 28, as shown. The sleeve is disposed internally of the nozzle and extends inwardly of the outer vessel to pass through a mating inlet aperture 34 of the inner vessel. The inlet sleeve 30 has a preselected loose fit with respect to the inner vessel inlet aperture to permit a preselected limited flow of coolant fluid therebetween, as at 36, so as to fill the space 16 between the inner vessel and the outer vessel with coolant fluid under a pressure substantially equal to the pressure of the coolant fluid in the inner vessel. Outlet means indicated generally at 38 are provided for the passage of coolant fluid from inside the inner vessel to outside the outer vessel. The outlet means are constructed in a manner similar to the inlet means just described and include an outwardly projecting outlet nozzle 40 carrying an internally disposed outlet sleeve 42 which passes through an outlet aperture 44 of the inner vessel. The sleeve 42 fits within the aperture 44 with a preselected loose fit, as at 46, to permit a preselected limited flow of fluid therebetween. Alternatively, and though not illustrated, the inlet and outlet sleeves 30 and 42 may be attached directly to the wall of the inner vessel at their respective inner vessel apertures 34, 44. In such case, the sleeve diameter is made slightly smaller than the internal diameter of the nozzle 28 or 40 into which it then extends, so that preselected limited amounts of coolant fluid flow between the nozzles and the space 16, rather than from the inner vessel to the space 16.

It will be appreciated that one inlet and one outlet means are shown. However, additional inlets and outlets may be employed depending upon the size and design of the reactor.

The inner vessel comprises a lower portion 48 and an upper portion or plug 50. The two portions are interconnected in any suitable manner such as by a threaded breechblock type of closure 52. That is, the threads are partially broken in conventional manner (not illustrated) so that the plug may be slidably inserted into position and then turned one quarter of a turn to lock it in position.

The outer vessel 10 has a lower portion 54 and an upper portion or cover 56 which is mounted thereon as by means of stud bolts 58 provided for the purpose.

At the tops of the vessels as shown, or at their bottoms (not illustrated), a plurality of conventional control rod drive shafts 64 pass from the outside of the outer vessel to the inside of the inner vessel. Each of the control rod drive shafts is slidable through a conventional control rod drive shaft seal-type opening 62 in the cover 56 of the outer vessel, and through a sleeved control rod drive shaft opening 60 in the plug 50 of the inner vessel. There is a loose fit between each opening 60 and its associated control rod drive 64 in order to allow additional coolant to enter the upper portion 66 of the space 16 between the inner and outer vessels. In this connection it will be noted that the coolant fluid flow passages provided by the openings 60 of the inner vessel are situated above the flanges 18 and 20, whereas the coolant fluid flow passages provided adjacent the inlet and outlet nozzles and apertures 28, 34 and 40, 44 are below the flanges. This provision of coolant fluid flow passages on either side of the mounting flanges diminishes or eliminates the need for the flange interface flow passages 24.

In the highly unlikely event that the outer vessel should rupture during normal operation of the nuclear reactor pressure vessel 11, the releasable fluid energy for throwing fragments of the outer vessel is minimal because most of the fluid is isolated from the outer vessel by the inner vessel. Since the inner vessel 12 is itself strong enough to withstand its contained fluid pressure, the major portion of coolant fluid will not be suddenly released in such event. In additon, and for the same reason, the conventional internal elements such as the blanket and core assemblies which are contained within the inner vessel will remain intact and substantially in place. The conventional reactor emergency devices, such as lines for introducing emergency cooling water for flooding and cooling the fuel, can be arranged to continue to be fully operative for their intended purposes under such circumstances.

On the other hand, in the event that the inner vessel should fail for any reason, the outer vessel being fully leakproof and pressure tight will not permit fluid release. It will also be noted that, due to balanced fluid pressures, the pressure is substantially the same on both sides of the inner vessel, and the possibility for failure of the inner vessel is substantially reduced. That is, the inner vessel is not subject to failure due to the presence of fluid pressure.

Thus has been described a nuclear reactor vessel structure which achieves all of the objects of the invention.

What is claimed is:

1. A nuclear reactor pressure vessel structure for containing nuclear reactor fuel assemblies and fluid under high pressure, said vessel structure comprising an inner pressure vessel for substantially containing said fluid under said pressure, an outer pressure vessel for containing said fluid under said pressure, said outer vessel encasing said inner vessel and having substantially the same shape and construction as said inner vessel, said outer vessel being spaced away from said inner vessel at substantially all locations between their respectively adjacent surfaces, means retaining said inner and outer vessels in said spaced relationship with respect to each other, means for introducing fluid under said pressure into said inner vessel from outside said outer vessel, and means connecting the interior of said inner vessel with the spacing between said inner and outer vessels for introducing said fluid under said pressure into said spacing, the interior of said inner vessel being substantially isolated from said spacing, said inner vessel having essentially the same strength as said outer vessel for resisting said pressure and being independently capable of substantially containing its contained fluid under said pressure in the event of rupture of said outer vessel.

2. A nuclear reactor pressure vessel structure according to claim 1 wherein the distance of said spacing between said inner and outer vessels is not greater than about two inches at substantially all of said locations.

3. A nuclear reactor pressure vessel structure according to claim 1 which further comprises fluid under pressure within said inner vessel and within said spacing between said inner and outer vessels, the pressure of said fluid within said spacing being substantially equal to the pressure of said fluid within said inner vessel.

4. A nuclear reactor pressure vessel structure according to claim 1 wherein said means connecting the interior of said inner vessel with the spacing between said inner and outer vessels for introducing said fluid under said pressure into said spacing comprises means providing leakage fluid flow passages extending between said interior of the inner vessel and said spacing.

5. A nuclear reactor pressure vessel structure according to claim 1 wherein said means for introducing fluid into said inner vessel from outside said outer vessel comprises means defining an inlet aperture of said inner vessel, an inlet nozzle on said outer vessel substantially in alignment with said inlet aperture of the inner vessel, and an inlet sleeve extending between said inner vessel inlet aperture and said outer vessel inlet nozzle and spanning across said spacing between said inner and outer vessels, and said means connecting the interior of said inner vessel with said spacing for introducing said fluid into said spacing comprises means defining a fluid flow passage adjacent to the exterior of said inlet sleeve.

6. A nuclear reactor pressure vessel structure according to claim 5 wherein said inlet sleeve has loose fit with respect to said inlet aperture of the inner vessel to provide said fluid flow passage extending between the interior of said inner vessel and said spacing between said inner and outer vessels.

7. A nuclear reactor pressure vessel structure according to claim 6 which further comprises outlet means for the passage of said fluid from the interior of said inner vessel to the outside of said outer vessel, said outlet means comprising means defining an outlet aperture of said inner vessel, an outlet nozzle on said outer vessel substantially aligned with said outlet aperture of the inner vessel, and an outlet sleeve extending between said inner vessel outlet aperture and said outer vessel outlet nozzle, said outlet sleeve having loose fit with respect to said outlet aperture of the inner vessel to provide a fluid flow passage extending between the interior of said inner vessel and said spacing between said inner and outer vessels.

8. A nuclear reactor pressure vessel structure according to claim 1 wherein said means retaining said inner and outer vessels in said spaced relationship comprises an inwardly projecting flange on said outer vessel, and an outwardly projecting flange on said inner vessel engaging said inwardly projecting flange on said outer vessel whereby said inner vessel is supported by said outer vessel.

9. A nuclear reactor pressure vessel structure according to claim 8 which further comprises means defining openings substantially along the interface between said flanges providing fluid flow passages between the respective portions of said spacing on either side of said flanges.

10. A nuclear reactor pressure vessel structure according to claim 1 which further comprises means defining a plurality of control rod drive shaft openings through said inner vessel, means defining a corresponding plurality of seal-type control rod drive shaft openings through said outer vessel and respectively aligned with said inner vessel control rod drive shaft openings, and a corresponding plurality of control rod drive shafts respectively passing through said control rod drive shaft openings from the exterior of said outer vessel to the interior of said inner vessel, each said control rod drive shaft having loose fit only with respect to its said associated inner vessel control rod drive shaft opening thereby providing a fluid flow passage from the interior of said inner vessel to said spacing between said inner and outer vessels.

11. A nuclear reactor pressure vessel structure for containing nuclear reactor fuel assemblies and fluid under high pressure, said vessel structure comprising an outer pressure vessel for containing said fluid under said pressure, an inner pressure vessel for substantially containing said fluid under said pressure, said inner vessel being completely encased within said outer vessel and having substantially the same shape and construction as said outer vessel, said inner vessel containing fluid under said pressure, said vessels being spaced one from the other a distance up to about two inches at substantially all locations therebetween, flange means interposed between said inner and outer vessels for supporting said inner vessel in said spaced relationship on said outer vessel, inlet means disposed at one side of said flange means for introducing said fluid under said pressure to the interior of said inner vessel from the outside of said outer vessel, said inlet means including means defining a passage for the flow of said fluid into said spacing between said inner and outer vessels, outlet means disposed at said one side of said flange means for the passage of said fluid from the interior of said inner vessel to outside said outer vessel, said outlet means including means defining a passage for the flow of said fluid from said spacing between said inner and outer vessels, means defining a plurality of spaced apart control rod drive shaft openings through said inner vesel at the opposite side of said flange means, means defining a corresponding plurality of seal-type control rod drive shaft openings through said outer vessel and respectively aligned with said control rod drive shaft openings of the inner vessel, and a corresponding plurality of control rod drive shafts respectively passing through said control rod drive shaft openings from the exterior of said outer vessel to the interior of said inner vessel, each said control rod drive shaft having loose fit only with respect to its said associated inner vessel control rod drive shaft opening thereby providing a passage for the flow of said fluid from the interior of said inner vessel into said spacing between said inner and outer vessels, all of said passages permitting flow of said fluid between the interior of said inner vessel and said spacing whereby the pressure of said fluid within said spacing is substantially equal to that of said fluid within said inner vessel, the interior of said inner vessel being substantially isolated from said spacing, said inner vessel having essentially the same strength as said outer vessel for resisting said pressure and being independently capable of substantially containing its contained fluid under said pressure in the event of rupture of said outer vessel.

References Cited

UNITED STATES PATENTS

| | | | |
|---|---|---|---|
| 575,526 | 1/1897 | McIntyre. | |
| 2,997,435 | 8/1961 | Millar et al. | 176—87 |
| 3,121,046 | 2/1964 | Trickett et al. | 176—87 |
| 3,282,459 | 11/1966 | Wilson | 220—3 |
| 3,235,465 | 2/1966 | McDaniel et al. | 176—64 |
| 3,395,076 | 7/1968 | Ruppen, Jr. | 176—65 |
| 3,398,050 | 8/1968 | Yevick et al. | 176—87 |
| 3,098,023 | 7/1963 | Schluderberg | 176—52 |

FOREIGN PATENTS 1,017,365  1/1966  Great Britain.

BENJAMIN R. PADGETT, Primary Examiner

H. E. BEHREND, Assistant Examiner

U.S. Cl. X.R.

176—38, 87; 220—3, 10